US005112373A

United States Patent [19]

Pham

[11] Patent Number: 5,112,373

[45] Date of Patent: May 12, 1992

[54] APPARATUS FOR CONTROLLING AND ELIMINATING VAPOR EMISSIONS AT A MANICURE WORK STATION

[76] Inventor: Hung Pham, 5082 Appian Way, El Sobrante, Calif. 94803

[21] Appl. No.: 716,551

[22] Filed: Jun. 17, 1991

[51] Int. Cl.[5] ............ B01D 50/00

[52] U.S. Cl. ............ 55/316; 55/473; 454/56; 454/63

[58] Field of Search ............ 55/473, 316; 98/115.3, 98/115.4

[56] References Cited

U.S. PATENT DOCUMENTS

| | | | |
|---|---|---|---|
| 2,147,314 | 2/1939 | Percy | 132/73 |
| 4,179,984 | 12/1979 | Gorcey | 98/115.3 |
| 4,252,054 | 2/1981 | Bakels | 98/115.1 |
| 4,553,992 | 11/1985 | Boissinot et al. | 55/279 |
| 4,647,295 | 3/1987 | Christ | 55/97 |
| 4,967,775 | 11/1990 | Kaiser | 132/73 |

*Primary Examiner*—Bernard Nozick
*Attorney, Agent, or Firm*—Thomas R. Lampe

[57] ABSTRACT

Apparatus for controlling and eliminating vapor emissions at a manicure work station including a housing disposed about an isolation chamber for accommodating one or more containers of vapor emitting materials. A plenum chamber is in communication with the isolation chamber and a fan delivers a flow of air from the isolation chamber into the plenum chamber and through a filter disposed between the plenum chamber and the ambient atmosphere.

8 Claims, 2 Drawing Sheets

APPARATUS FOR CONTROLLING AND ELIMINATING VAPOR EMISSIONS AT A MANICURE WORK STATION

TECHNICAL FIELD

This invention relates to an apparatus for controlling and eliminating vapor emissions at a manicure work station. More particularly, the arrangement disclosed herein is of low cost, portable construction and selectively positionable on support surface being used by a manicurist. The apparatus includes an isolation chamber for accommodating one or more containers of vapor-emitting materials in use by the manicurist and a combination of structural elements which cooperate to remove vapors from the isolation chamber and filter same to prevent their emission into the ambient atmosphere.

BACKGROUND ART

U.S. Pat. No. 4,852,468, issued Aug. 1, 1989, illustrates a ventilated work station for sculpting fingernails. The work station includes a desk-like arrangement defining a platform which supports and is fixedly connected to a transparent hood. An exhaust fan is connected with ducts leading to the hood and slots for producing a low pressure in the area confined by the hood to convey fumes away from the work area.

The arrangement of U.S. Pat. No. 4,852,468 is of unitary construction; the hood and platform defining means are permanently installed and affixed together along with the extensive duct work and related equipment which is used to convey fume-laden air from the work site to a remote location.

Quite obviously, such an approach is characterized by relatively high expense both with regard to the equipment itself and its installation. Furthermore, such a device is relatively energy intensive in that high capacity fan must be employed to convey air to the remote location.

Another deficiency in this prior art arrangement is that the entire area or interior of the hood is evacuated generally uniformly by the fan means. Open bottles of manicure chemicals are the source of the most concentrated and potentially harmful fumes. The device of U.S. Pat. No. 4,852,468 does not make efficient use of the air currents within the hood to concentrate them in the vicinity of the containers during vapor removal.

U.S. Pat. No. 4,647,295, issued Mar. 3, 1987, is directed to a work top air cleaner which includes a passageway formed in the work top through which air is removed and directed to a filter box. Such an arrangement does not include a hood to protect the manicurist and customer nor does the device of U.S. Pat. No. 4,647,295 consider the problem of eliminating noxious fumes or vapors from open containers. It is obvious that this prior art approach would not be effective for such purpose.

A search relating to this invention also located the following existing patents: U.S. Pat. No. 2,147,314, issued Feb. 14, 1939, U.S. Pat. No. 4,553,992, issued November 1985, U.S. Pat. No. 4,179,984, issued Dec. 25, 1979, U.S. Pat. No. 4,252,054, issued Feb. 24, 1981, and U.S. Pat. No. 4,967,775, issued Nov. 6, 1990. None of these patents disclose an arrangement of the type set forth in the present application. Among other things, there is no showing of the portable arrangement which will be described in detail below which operates to efficiently and cheaply control noxious emissions at a manicurist's work station, particularly those emissions which are in their most concentrated and potentially harmful form at the locations of containers utilized by the manicurist during the course of his or her work.

DISCLOSURE OF INVENTION

The apparatus of the present invention is utilized to effectively control and eliminate vapor emissions at a manicure work station in a highly efficient and cost effective manner. The apparatus if of portable, lightweight construction and requires no special duct work or other expensive components in order to carry out its task. The apparatus serves to isolate open containers of chemicals employed by the manicurist and provide for the efficient removal of fumes or vapors at the location of isolation so that they do not harm the manicurist or customer or are emitted into the ambient atmosphere.

The apparatus incorporates a housing which is positionable on the support surface of a manicure work station. The apparatus is portable and readily removable from the support surface when desired. The housing includes a pair of spaced side walls positionable o the support surface and a cover extending between the side walls. The side walls and the cover define an interior and a pair of opposed, spaced housing openings extending upwardly from the support surface when the housing is positioned on the support surface. The pair of openings provide communication between the interior and the ambient atmosphere.

A chamber wall extends from one of the housing side walls and has a lower end located at the support surface when the housing is positioned on the support surface. The chamber wall and said one side wall at least partially define an isolation chamber for accommodating one or more containers of vapor emitting materials in use by a manicurist. In addition, the chamber wall and the one side wall define a chamber opening leading from the isolation chamber to that portion of the housing interior not occupied by the isolation chamber. The chamber opening is spaced inwardly from an oriented toward one of the housing openings.

The apparatus additionally includes plenum defining means connected to the housing adjacent to the side wall operatively associated with the chamber wall to at least partially define a plenum chamber in fluid-flow communication with the isolation chamber.

Filter means is disposed between the plenum chamber and the ambient atmosphere. Fan means is incorporated in the apparatus for creating an air flow from the isolation chamber into the plenum chamber and out of the plenum chamber through the filter means into the ambient atmosphere.

Other features, advantages, and objects of the present invention will become apparent with reference to the following description and accompanying drawings.

BEST MODE FOR CARRYING OUT THE INVENTION

Figure 1:
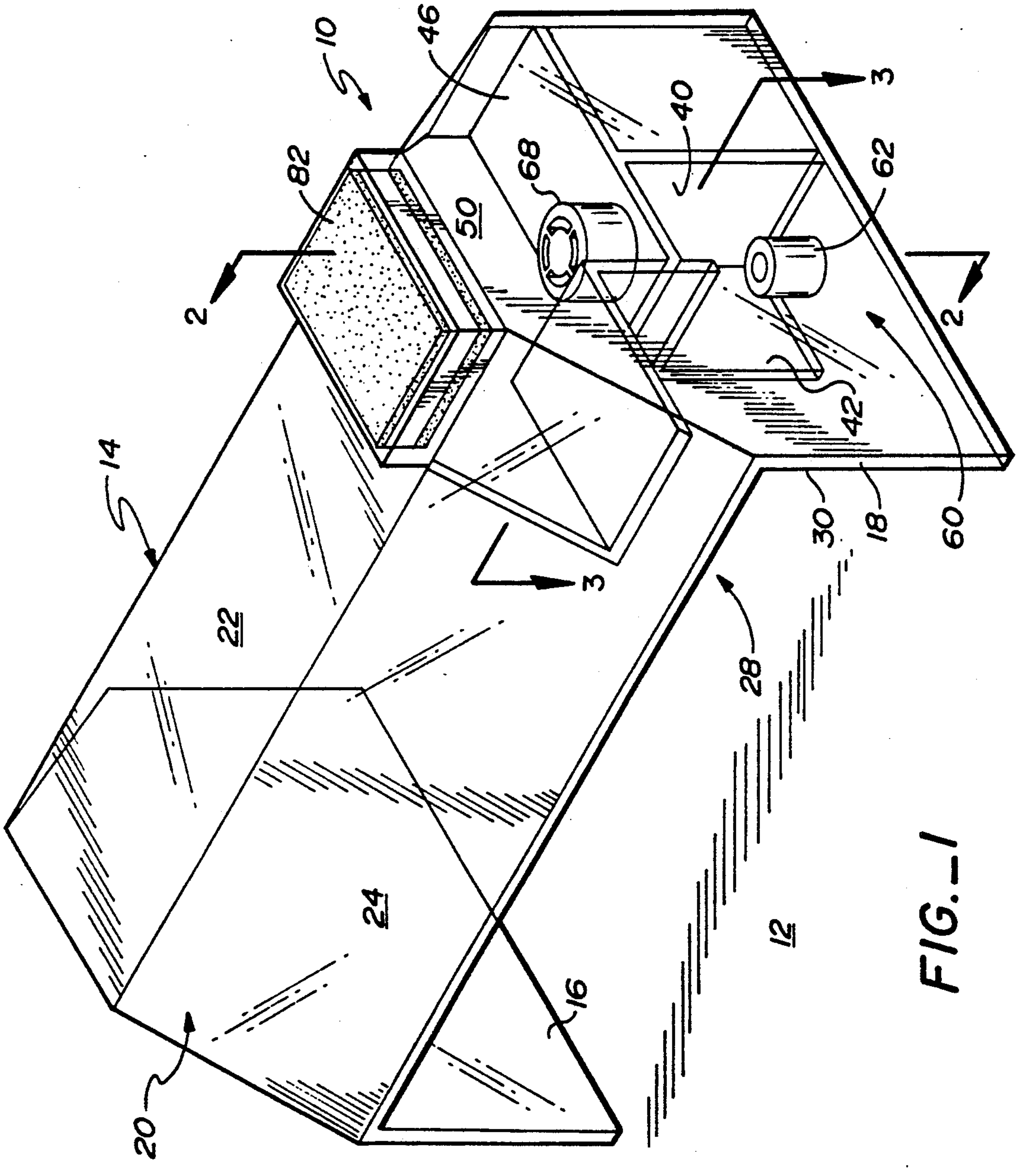
FIG. 1 is a perspective view of apparatus constructed in accordance with the teachings of the present invention.
Figure 2:
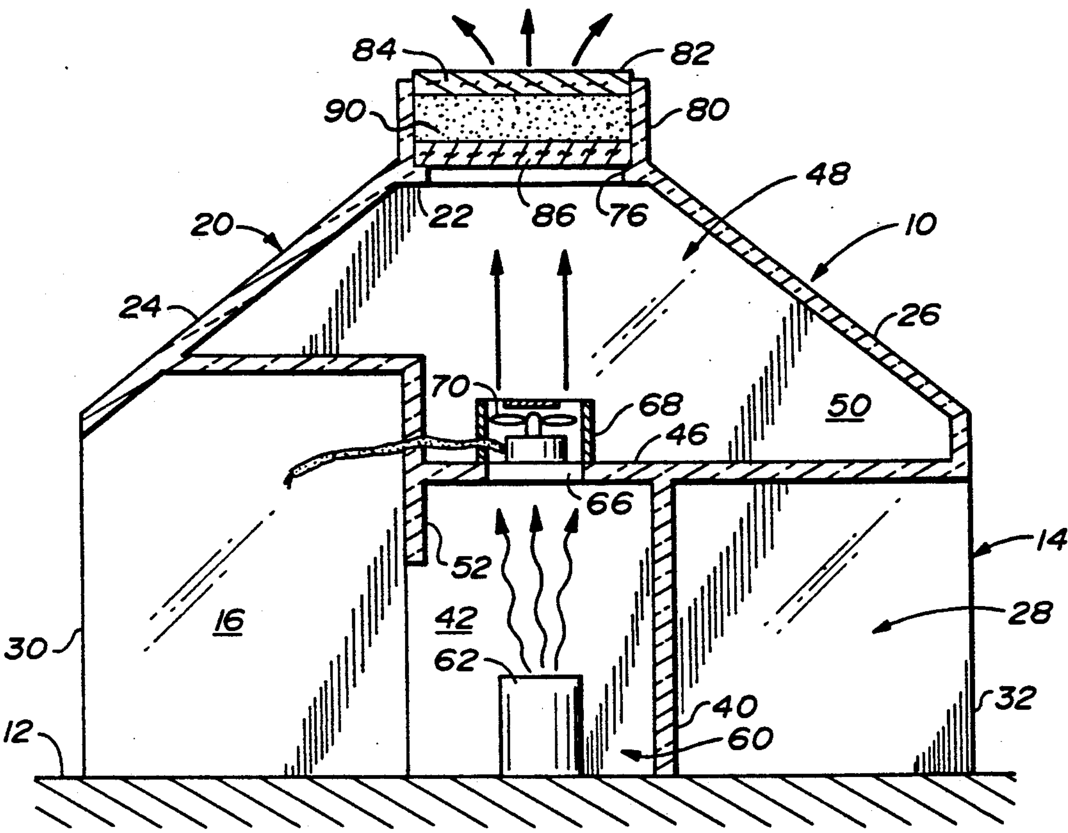
FIG. 2 is a enlarged cross-sectional view taken along the line 2—2 in FIG. 1.
Figure 3:
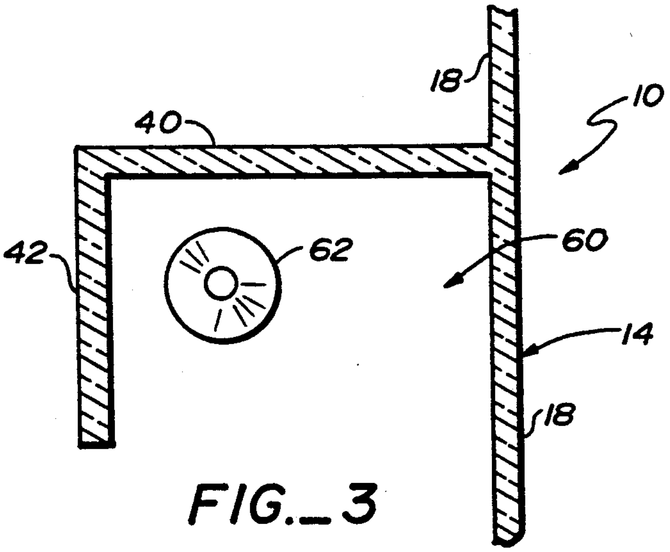
FIG. 3 is an enlarged cross-sectional view of a predetermined portion of the apparatus as taken along the line 3—3 in FIG. 1.

Referring now to the drawings, apparatus constructed in accordance with the teachings of the present invention is generally designated by reference numeral 10. The apparatus is for the purpose of controlling and eliminating vapor or fume emissions at a manicure work station having a support surface. Such surface, which may for example be a desk or table of any suitable type, is designated in FIG. 2 by reference number 12.

Apparatus 10 includes a housing 14 including a pair of spaced side walls 16, 18 positionable on support surface 12 and a cover 20 extending between the side walls, as shown. The cover includes a generally rectangular, horizontally disposed upper panel 22 and dependent panels 24, 26 along opposed edges thereof.

Side walls 16, 18 and cover 20 define an interior 28 and a pair of opposed, spaced housing openings 30, 32 extending upwardly from the support surface 12 when the housing is positioned on the support surface. The openings 30, 32 provide communication between the interior 28 and the ambient atmosphere.

A first chamber wall 40 extends from side wall 18 and extends at generally right angles thereto. A second chamber wall 42 is connected to first chamber wall 40 at the distal end thereof and extends generally at right angles thereto in a plane generally parallel to the plane of side wall 18.

Positioned above chamber walls 40, 42 and connected to the chamber walls is a bottom wall 46 defining the lower extent of a plenum chamber 48. As may be seen, the bottom wall 46 is multi-segmented and extends between panels 24, 26 of cover 20. Furthermore, the bottom wall 46 extends between side wall 18 and a divider panel 50 also extending between the cover panels 24, 26. A flange 52 projects downwardly from bottom wall 46 at the end of second chamber wall 42 and extends into engagement with side wall 18.

Chamber walls 40, 42, plenum defining means bottom wall 46, and support surface 12, when the apparatus 10 is positioned on the support surface, define an isolation chamber 60. The isolation chamber 60 is employed to accommodate one or more containers of chemicals or materials employed by the manicurist and utilized by him or her. One such container is shown in the drawings and designated by means of reference numeral 62; however, it is to be understood that a plurality of containers is often utilized for carrying out the various steps of fingernail treatment. It is not uncommon for the open container or containers utilized by the manicurist to emit noxious fumes and vapors. Of course, the manicurist could continually cover and uncover the container when attending to a customer to cut down on such emissions, but this is highly inconvenient and time consuming.

The isolation chamber 60 is readily accessible through an opening between side wall 18 and second chamber wall 42 below flange 52 in the direction of the manicurist. Chamber wall 40, on the other hand, is positioned between the customer and the isolation chamber.

A throughbore 66 is formed in the bottom wall 46 and interconnects the isolation chamber with the plenum chamber. A fan housing 68 projects upwardly from the bottom wall 46 about the periphery of throughbore 66 and accommodates therein a conventional electric fan 70. The fan induces a flow of air from the isolation chamber into the plenum chamber as shown by the arrows in FIG. 2. A suitable on/off switch (not shown) may be employed to selectively actuate the fan. Air flow into plenum chamber 48 will cause a positive air pressure to be created therein.

Housing cover 20 defines an aperture 76 above the plenum chamber. Projecting upwardly from upper panel 22 of the cover is a holder 80 formed by a plurality of interconnected upstanding wall elements disposed about the periphery of the aperture 76 and closely adjacent thereto. The holder 80 accommodates a filter 82 through which air from plenum chamber 48 passes under the urging of fan 70 into the ambient atmosphere. Such filter is for the purpose of absorbing and eliminating from the flow of air the vapors or fumes being emitted from container 60 as well a additional containers if such exists.

The illustrated filter 80 comprises upper and lower layers 84, 86, respectively, of porous inert material such as mats of fiberglass or plastic fibers. Disposed between the layers 84, 86 is a layer of activated charcoal 90. It will be appreciated that other suitable forms of filters may be employed as desired. It is also to be understood that more than one aperture may be formed in the cover communicating with the plenum chamber, each aperture having a filter associated therewith.

It is preferred that the housing side walls and cover be formed of transparent material such as sheets of plastic, said sheets being joined together by any suitable means such as adhesive. Alternatively, of course, the housing may be integrally molded from such plastic sheet material. The various other walls employed in the apparatus may also be formed of transparent plastic sheet material if so desired, either integrally molded, as appropriate, or assembled and secured together.

I claim:

1. Apparatus for controlling and eliminating vapor emissions at a manicure work station having a support surface, said apparatus comprising, in combination:
   - a housing including a pair of spaced side walls positionable on said support surface and a cover extending between the side walls, said side walls and cover defining an interior and a pair of opposed, spaced housing openings extending upwardly from said support surface when said housing is positioned on said support surface and providing communication between said interior and the ambient atmosphere;
   - a first chamber wall extending from one of said side walls and having a lower end located at said support surface when the housing is positioned on the support surface and a second chamber wall extending from said first chamber wall, said chamber walls and said one side wall at least partially defining an isolation chamber for accommodating one or more containers of vapor emitting materials in use by a manicurist and a chamber opening leading from said isolation chamber to that portion of said housing interior not occupied by said isolation chamber, said chamber opening being spaced inwardly from and oriented toward one of said housing openings;
   - plenum defining means connected to said housing adjacent to said one side wall at least partially defining a plenum chamber in fluid-flow communication with said isolation chamber;
   - filter means disposed between said plenum chamber and the ambient atmosphere; and fan means for creating an air flow from said isolation chamber into said plenum chamber and out of said plenum chamber through said filter means into the ambient atmosphere through an outlet.

2. The apparatus according to claim 1 wherein said housing, said chamber wall, and said plenum defining means are constituted of plastic sheets rigidly secured together to form an integral, portable unit selectively positionable on said support surface.

3. The apparatus according to claim 1 wherein said housing cover defines at least one aperture above said plenum chamber, said filter means comprising at least one filter located on said housing cover and disposed over said aperture.

4. The apparatus according to claim 3 additionally comprising a holder for said at least one filter, said holder including a plurality of interconnected upstanding wall elements disposed about the periphery of said aperture and closely adjacent thereto.

5. The apparatus according to claim 4 wherein said filter is disposed within the perimeter defined by said wall elements and includes activated charcoal.

6. The apparatus according to claim 1 wherein said plenum defining means includes a bottom wall disposed over said isolation chamber and connected to said one side wall and to said chamber wall.

7. The apparatus according to claim 6 wherein said isolation chamber is defined by two interconnected chamber walls, said plenum defining means bottom wall, and said support surface when said apparatus is positioned on said support surface, one of said interconnected chamber walls being disposed generally perpendicular to said one side wall and attached thereto and the other of said interconnected chamber walls being generally parallel to said one side wall and spaced therefrom.

8. The apparatus according to claim 6 wherein said plenum defining means bottom wall has a throughbore formed therein interconnecting said isolation chamber and said plenum chamber, said fan means being positioned at said throughbore.

* * * * *